US007775876B2

(12) United States Patent
Rowe

(10) Patent No.: US 7,775,876 B2
(45) Date of Patent: Aug. 17, 2010

(54) METHOD AND APPARATUS FOR TRACKING GAME PLAY

(75) Inventor: Rick Rowe, Henderson, NV (US)

(73) Assignee: IGT, Reno, NV (US)

( * ) Notice: Subject to any disclaimer, the term of this patent is extended or adjusted under 35 U.S.C. 154(b) by 860 days.

(21) Appl. No.: 10/188,415

(22) Filed: Jul. 3, 2002

(65) Prior Publication Data

US 2002/0177480 A1 Nov. 28, 2002

Related U.S. Application Data

(63) Continuation-in-part of application No. 10/116,680, filed on Apr. 4, 2002.

(60) Provisional application No. 60/281,875, filed on Apr. 4, 2001.

(51) Int. Cl.
*A63F 13/00* (2006.01)

(52) U.S. Cl. .............................. 463/25; 463/16; 463/32

(58) Field of Classification Search .................. 463/25, 463/30–34, 7, 42, 40, 16; 705/10; 273/148 R
See application file for complete search history.

(56) References Cited

U.S. PATENT DOCUMENTS 4,072,930 A 2/1978 Lucero et al.
4,283,709 A 8/1981 Lucero et al.
4,531,187 A * 7/1985 Uhland ........................ 463/12
4,845,650 A 7/1989 Meade et al.
5,013,038 A 5/1991 Luxenberg et al.
5,114,155 A * 5/1992 Tillery et al. ................ 273/371
5,259,613 A 11/1993 Marnell, II
5,586,936 A 12/1996 Bennett et al.
5,611,730 A 3/1997 Weiss
5,655,961 A 8/1997 Acres et al.

(Continued)

FOREIGN PATENT DOCUMENTS

CA 2270062 10/1999

(Continued)

OTHER PUBLICATIONS

Patents Act 1977 Examination Report under Section 18(3), Appl. No. GB0307662.7.

(Continued)

*Primary Examiner*—Dmitry Suhol
*Assistant Examiner*—Andrew Kim
(74) *Attorney, Agent, or Firm*—Weaver Austin Villeneuve & Sampson LLP

(57) ABSTRACT

The invention is a method for tracking activities at a gaming machine and a system for player tracking. One embodiment of a method comprises generating data regarding individual activities associated with the operation of a gaming machine, transmitting the generated activity data to a remote location, storing the data at the remote location, and mining or manipulating the stored data based on one or more characteristics or criteria and generating an output. In one embodiment, the data is mined and the output is represented graphically, such as in a three-dimensional graph. In one embodiment, the generated data includes information regarding the identify of the player associated with the event, and the stored individual event data is mined to determine if the player has met criteria entitling the player to an award or "comp" separate from the awards provided by the gaming machine.

34 Claims, 3 Drawing Sheets

U.S. PATENT DOCUMENTS

| | | | | |
|---|---|---|---|---|
| 5,692,199 | A | 11/1997 | Kikinis et al. | |
| 5,702,303 | A | 12/1997 | Takemoto et al. | |
| 5,702,304 | A * | 12/1997 | Acres et al. | 463/29 |
| 5,741,183 | A * | 4/1998 | Acres et al. | 463/42 |
| 5,761,647 | A | 6/1998 | Boushy | |
| 5,766,075 | A | 6/1998 | Cook et al. | |
| 5,851,149 | A | 12/1998 | Xidos et al. | |
| 6,003,013 | A | 12/1999 | Boushy et al. | |
| 6,048,269 | A | 4/2000 | Burns et al. | |
| 6,056,289 | A | 5/2000 | Clapper | 273/138 |
| 6,142,876 | A * | 11/2000 | Cumbers | 463/25 |
| 6,183,362 | B1 | 2/2001 | Boushy | |
| 6,234,900 | B1 | 5/2001 | Cumbers | |
| 6,254,483 | B1 | 7/2001 | Acres | |
| 6,280,325 | B1 | 8/2001 | Fisk | |
| 6,302,793 | B1 | 10/2001 | Fertitta, III et al. | |
| 6,319,125 | B1 | 11/2001 | Acres | |
| 6,340,331 | B1 | 1/2002 | Saunders et al. | |
| 6,375,567 | B1 * | 4/2002 | Acres | 463/25 |
| 6,511,377 | B1 | 1/2003 | Weiss | |
| 6,577,733 | B1 * | 6/2003 | Charrin | 380/251 |
| 6,592,044 | B1 | 7/2003 | Wong et al. | |
| 6,628,939 | B2 | 9/2003 | Paulsen | |
| 6,682,421 | B1 | 1/2004 | Rowe et al. | |
| 6,712,695 | B2 | 3/2004 | Mothwurf et al. | |
| 6,758,393 | B1 | 7/2004 | Luciano et al. | |
| 6,773,347 | B1 | 8/2004 | Marshall et al. | |
| 6,848,995 | B1 | 2/2005 | Walker et al. | |
| RE38,812 | E | 10/2005 | Acres et al. | |
| 2001/0019966 | A1 | 9/2001 | Idaka | 463/40 |
| 2001/0041610 | A1 | 11/2001 | Luciano et al. | 463/16 |
| 2001/0044337 | A1 | 11/2001 | Rowe et al. | |
| 2002/0029207 | A1 | 3/2002 | Bakalash et al. | |
| 2002/0082076 | A1 | 6/2002 | Roser et al. | |
| 2002/0123376 | A1 | 9/2002 | Walker et al. | |
| 2002/0132664 | A1 | 9/2002 | Miller et al. | |
| 2002/0187834 | A1 | 12/2002 | Rowe et al. | |
| 2002/0198052 | A1 | 12/2002 | Soltys et al. | |
| 2003/0045354 | A1 | 3/2003 | Giobbi | |
| 2003/0087691 | A1 | 5/2003 | Kiely et al. | |
| 2003/0186739 | A1 | 10/2003 | Paulsen et al. | |

FOREIGN PATENT DOCUMENTS

| | | | |
|---|---|---|---|
| GB | 2193441 | | 2/1988 |
| GB | 2205188 | | 11/1988 |
| JP | 409140897 A | * | 6/1997 |
| WO | WO00/03775 | | 1/2000 |
| WO | WO00/16864 | | 3/2000 |
| WO | WO00/77682 | | 12/2000 |
| WO | WO01/16864 | | 3/2001 |
| WO | WO01/16888 | | 3/2001 |
| WO | WO01/83062 | | 11/2001 |
| WO | WO02/21467 | | 3/2002 |
| WO | WO02/25494 | | 3/2002 |
| WO | WO 02/25560 | | 3/2002 |

OTHER PUBLICATIONS

Patents Act 1977 Examination Report under Section 18(3), Appl. No. GB0307663.5.
Jyoti Shamdasani, "Report No. 2 on patent application No. 2003203543 by IGT". Apr. 10, 2006. 2 pages.
Canadian Office Action issued on Jul. 25, 2006 3 pages.
Great Britain Examination Report dated Jul. 26, 2006, 7 pages.
"Pocket PC—The Wireless Wonder Turns 1," available at: http://www.microsoft.com/presspass/features/2001/apr01/04-18pocketpc.mspx.
Australian Examination Report on patent application No. 2003203542 dated Aug. 17, 2006, 3 pages.
Canadian Office Action issued on Dec. 7, 2006 6 pages.
Office Action on Dec. 14, 2006 for Application No. GB0307663.5.
First Report for Australian Patent Application No. 2006201826 dated Mar. 11, 2008.
Office Action on Jun. 5, 2008 for Application No. 2,424,421.
Office Action on Jun. 9, 2008 for Application No. 2,424,420.
Forsman, Sarah (1997) "OLAP Council White Paper," (On-Line Analytical Processing) White paper [online]. San Rafael, CA.; [retrieved on Dec. 19, 2002] Retrieved from the internet: http://www.olapcouncil.org/research/whtpapco.htm, 4 pages.
IGWB (International Gaming & Wagering Business), vol. 17, No. 9, Sep. 1996, 4 pages. (cover and 3 pages).
IGWB (International Gaming & Wagering Business), vol. 18, No. 9, Sep. 1997, 10 pages (cover and pp. 73-81).
AU First Examiner's Report dated Jun. 2, 2009 issued in Australian Patent Application No. 2007202835, 3 pages.
AU First Examiner's Report dated Dec. 23, 2008 issued in Australian Patent Application No. 2007200126, 2 pages.
AU Second Examiner's Report dated Jan. 18, 2010 issued in Australian Appln No. 2007200126, 3 pp.
CA Office Action dated Jun. 16, 2009 issued in Canadian Patent Application No. 2,424,420, 8 pages.
EP Partial Search Report under Rule 46(1) EPC, dated May 28, 2004 issued in EP Appln No. 03007706.0, 8 pp.
US Office Action dated Sep. 13, 2004 issued in U.S. Appl. No. 10/116,680.
US Final Office Action dated Jan. 14, 2005 issued in U.S. Appl. No. 10/116,680.
US Office Action dated Dec. 13, 2005 issued in U.S. Appl. No. 10/116,680.
US Notice of Informal or Non-Responsive RCE Amendment dated Jul. 14, 2005 issued in U.S. Appl. No. 10/116,680.
US Final Office Action dated Jun. 29, 2006 issued in U.S. Appl. No. 10/116,680.
US Office Action dated Dec. 26, 2006 issued in U.S. Appl. No. 10/116,680.
US Office Action dated Apr. 9, 2007 issued in U.S. Appl. No. 10/116,680.
US Final Office Action dated Oct. 11, 2007 issued in U.S. Appl. No. 10/116,680.
US Office Action dated Jan. 24, 2008 issued in U.S. Appl. No. 10/116,680.
US Final Office Action dated Oct. 29, 2008 issued in U.S. Appl. No. 10/116,680.
US Office Action dated Jul. 24, 2009 issued in U.S. Appl. No. 10/116,680.
US Examiner's Interview Summary dated Nov. 10, 2009 issued in U.S. Appl. No. 10/116,680.
US Notice of Allowance and Allowability dated Feb. 23, 2010 issued in U.S. Appl. No. 10/116,680.
US Office Action dated Sep. 7, 2005 issued in U.S. Appl. No. 10/244,111.
US Final Office Action dated Feb. 21, 2006 issued in U.S. Appl. No. 10/244,111.
US Office Action dated Aug. 11, 2006 issued in U.S. Appl. No. 10/244,111.
US Office Action dated Mar. 26, 2007 issued in U.S. Appl. No. 10/244,111.
US Examiner Interview Summary dated Aug. 1, 2007 issued in U.S. Appl. No. 10/244,111.
US Final Office Action dated Oct. 10, 2007 issued in U.S. Appl. No. 10/244,111.
US Office Action dated Apr. 25, 2008 issued in U.S. Appl. No. 10/244,111.
US Final Office Action dated Nov. 26, 2008 issued in U.S. Appl. No. 10/244,111.

* cited by examiner 100
102

| | | | |
|---|---|---|---|
| Event | 2651 | 2652 | — — — — |
| Machine | XIA3522 | XIA3546 | — — — |
| Player | M. Smith 418632A | A. Jones 436211A | — — — |
| Time In | 11:49:02 AM | 10:01:08 AM | — — — |
| Time Out | – | – | — — — |
| Time Start | 12:42:06 PM | 12:43:04 PM | — — — |
| Time End | 12:43:52 PM | 12:44:01 PM | — — — |
| Outcome | Game Win | Lose | — — — |
| Bet | $1.00 | $5.00 | — — — |
| Win | $5.00 | – | — — — |

METHOD AND APPARATUS FOR TRACKING GAME PLAY

RELATED APPLICATION DATA

This application is a continuation-in-part of U.S. application Ser. No. 10/116,680 filed Apr. 4, 2002, which claims the benefit of U.S. Provisional Application Ser. No. 60/281,875 filed Apr. 4, 2001.

FIELD OF THE INVENTION

The present invention relates to a method and apparatus for tracking events or activities associated with a gaming machine, such as an individual's game play for establishing entitlement to a reward.

BACKGROUND OF THE INVENTION

As an incentive for players to play games, many casinos provide a player reward system. In accordance with the reward system, a player's frequent play of one or more games is generally rewarded or compensated apart from any winnings the player may receive as a result of participating in the game directly. These rewards are generally referred to as "comps." Comps may comprise awards such as free game plays, money, and free or discounted goods or services.

In accordance with the traditional reward system, a player enrolls in the casino's player reward system, establishing an identity. The casino generates one or more files associated with the player's identity. The player is issued a player tracking card having identification information associated with it. When a player plays a game, the player inserts their tracking card into a card reader. The reader reads the identification information and provides the information to a central computer where the player's file is stored. Thereafter, when the player plays the game, game play information is sent to the central computer and used to update the player's file with play information.

Most commonly, a player is awarded points for engaging in certain activities. For example, a player may be rewarded one or more points based upon amounts bet. Generally, points are generated at the gaming machine. For example, if a player wagers ten credits, then the player tracking device at the gaming machine may indicate that the player is entitled to one player reward point. The point information is accumulated during the player's play session, and then at the end of the session, a point total is transmitted to a remote server. The server maintains data records, such as player files, and associates the transmitted point information from the various gaming machines linked to it with the appropriate player to whom the points belong.

A player may travel to a player reward host and obtain information regarding the number of points acquired. If the level of points is sufficient, the player may be provided a reward.

In some instances, a casino may provide a player a "comp" even though the player has not yet reached a particular point level. For example, based on a player's past history of play, such as by examining the total number of points received over a predetermined earlier period of time, the casino may grant a player a comp such as a free nights' stay in order to entice the player to play more.

These player reward systems have a number of disadvantages. First, they are generally fairly rudimentary. The reward system generates player points based upon play, and then a player is permitted to redeem those points for an award once the points are acquired. Such a system does not track the player win for games played. A casino would rather reward players who bet large sums and win little than players who bet large sums and win large sums. The system also does not allow for tracking of the player's betting habits except for the player's bets over time. The system, for example, does not indicate which games the player prefers to play, games at which the player bets more to play, or the game which the player loses more money when playing. Such information would be extremely useful to a casino, not only from the standpoint of determining the best manner for awarding player play rewards, but for determining the games which yield the highest returns and that get played on an ongoing basis.

An improved tracking system for gaming machine play is desired.

SUMMARY OF THE INVENTION

The present invention is a method of tracking activities occurring at one or more gaming machines, and a system for collecting and utilizing game play activity information.

One embodiment of a method comprises the tracking of gaming machine activity. The method includes the step of generating data regarding individual activities associated with the operation of a gaming machine. The generated activity data is transmitted to a remote location and stored at the remote location. The stored data is then mined or manipulated based on one or more characteristics or criteria, and an output is generated.

The individual activity information comprises data regarding individual acts or events, and is transmitted for storage in an un-manipulated, such as un-aggregated, form. The individual activities may comprise a wide variety of acts or events, such as the providing of value to the gaming machine via the input of currency, coin, value ticket or credit. The data generated as a result of the activity may comprise the amount of the value provided by the input or the like.

In one embodiment, the method includes the step of identifying a player of the gaming machine and associating the generated data with the identified player. The generated data is stored in a set in a file at said remote location, the set including a plurality of fields, one of said fields comprising the identity of the player and one or more of the other fields comprising information regarding the activity.

In one embodiment of the method, the output comprises an aggregation of data which satisfies the one or more characteristics used to mine the data. For example, the output may comprise the sum of all individual data regarding amounts provided by a particular player during a period of time.

In one embodiment the method includes the step of graphically displaying the output. As one aspect of the invention, the generated and stored data may comprise information regarding three or more characteristics of the activity or event. For example, the data may include information regarding the particular gaming machine being played, the identity of the casino where the gaming machine is located, and the aggregated value of winnings paid by the gaming machine. In this event, the output may be graphically displayed in three-dimensions.

The method of the invention may be utilized to determine entitlement of a player of one or more gaming machines to an award separate from any awards provided by the one or more gaming machines as a result of game play. In accordance with this method, generated and stored data regarding individual activities or events at the one or more gaming machines are manipulated to determine if the player has met one or more requirements for entitlement to an award separate from any awards provided by said gaming machine. For example, data regarding particular amounts wagered during separate events by a player may be aggregated to determine that a player has wagered a sufficient level of value to be entitled to an award. The data may also be aggregated to determine that a player has presented a sufficient number of value tickets to a gaming machine during a specified period of time to be entitled to such an award.

In one embodiment, the application of criteria or characteristics to the stored individual activity data is performed at one or more times, such as predetermined time intervals. In one embodiment, the criteria may be utilized to determine that the player is engaged in a playing trend which entitles a player to an award.

One embodiment of the invention comprises one or more systems for implementing the methods of the invention. In one embodiment, a system includes one or more gaming machines and at least one host. A communication link is provided between the one or more gaming machines and the host. Generated activity data or information is transmitted to the host for storage and manipulation. Preferably, the host includes a least one display adapted to display the output of the manipulation of the stored data.

In one embodiment, the gaming machines of the system are located at differing locations, such as different casinos or gaming establishments. The individual activity information may include information regarding the location of the gaming machine. In this manner, the stored data may be mined or manipulated to determine trends at particular casinos or variations in activities at different casinos.

Further objects, features, and advantages of the present invention over the prior art will become apparent from the detailed description of the drawings which follows, when considered with the attached figures.

DETAILED DESCRIPTION OF THE INVENTION

The invention is a system and method for tracking or monitoring game play by one or more players of one or more gaming machines. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One or more embodiments of the invention comprise a gaming machine activity tracking system. The tracking system is configured to collect and store raw gaming machine activity data. The invention also comprises methods of utilizing collected data. In one embodiment, criteria are applied to the collected data for a variety of purposes. One purpose is to determine if a player is entitled to a reward, such as a bonus or complimentary award based upon various criteria of game play. In another embodiment, a method comprises graphically rendering and displaying the collected data, including in a three-dimensional graphical output.

Figure 1:
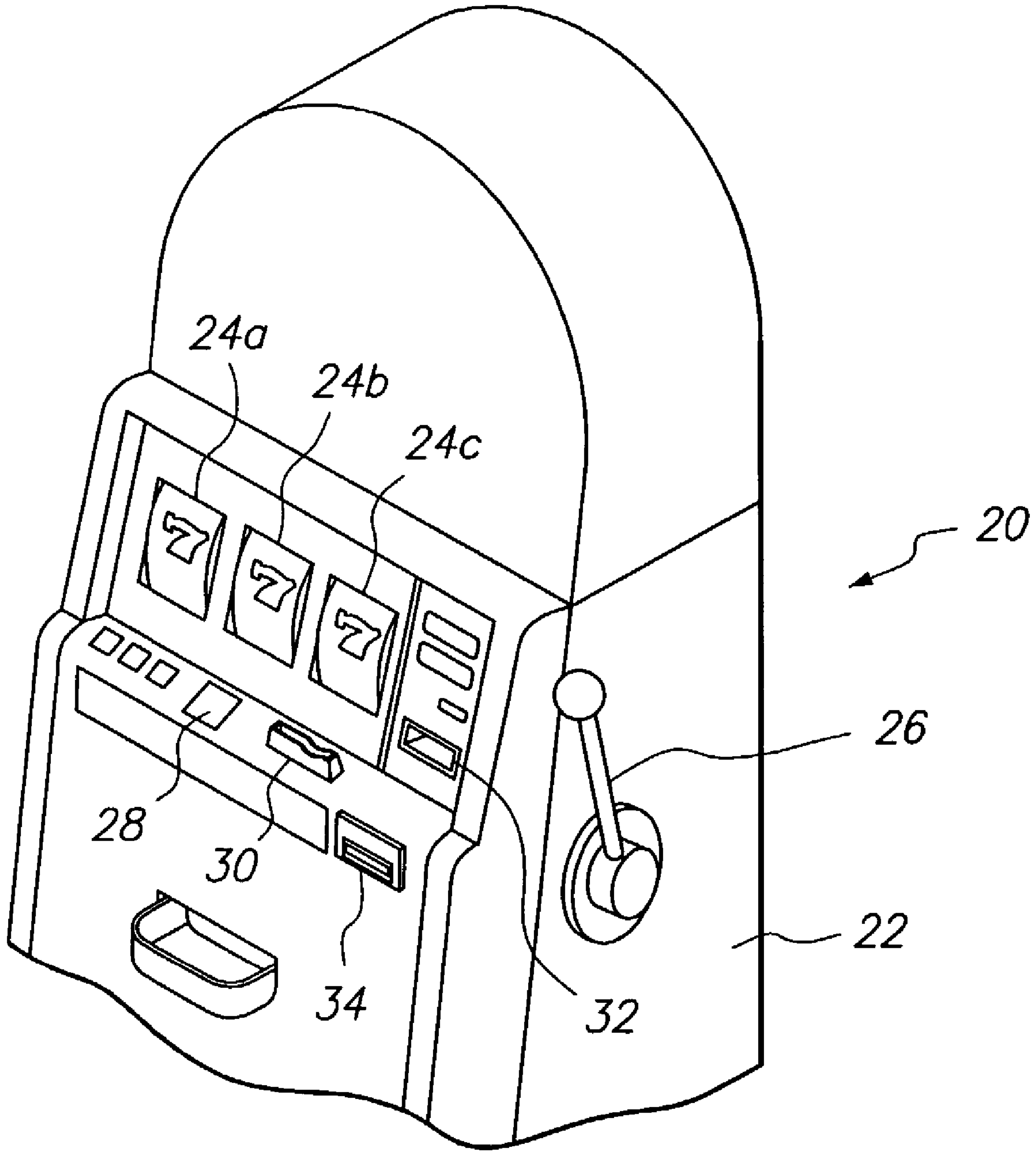
FIG. 1 is a perspective view of a portion of a gaming machine of the type which may be subject to activity tracking in accordance with the invention.

In a preferred embodiment, a system and method are provided for monitoring or tracking gaming machine activity. FIG. 1 illustrates one embodiment of a gaming machine or device 20 which may be monitored. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of "slots," and includes three rotating reels 24*a,b,c*. A handle 26 or spin button 28 may be used to effectuate rotation of the reels 24*a,b,c*.

In this well known game, a player may be awarded an award if the result of the rotation of the reels 24*a,b,c* is a predetermined combination of symbols. It should be understood that the gaming machine 20 may be adapted to present one or more of a wide variety of games. Depending upon the game present, the configuration of the machine may vary. For example, in the event the gaming machine 20 is adapted to present the game of video poker, then the gaming machine 20 may include a video display.

In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award. In one arrangement, the award may be winnings in proportion to the amount wagered or bet by the player.

In order to accept a wager, the gaming machine 20 may include a coin acceptor 30 for accepting coins. The gaming machine 20 may also include a bill acceptor or validator 32 for accepting paper currency. The gaming machine 20 may be provided with other means for accepting or verifying value, such as a credit card reader. In one embodiment, the validator 32 or a separate validating device may be used to receive tickets representing value. These tickets may have, for example, bar-coded information representing monetary value.

In a preferred embodiment of the invention, the gaming machine 20 includes a means for receiving player identification information. In one embodiment this means comprises a card reader 34 or other device. As illustrated, the card reader 34 comprises a magnetic stripe reader for reading encoded information from a magnetic stripe of a player card. The means may comprise a variety of other devices, such as means for reading information from other types of devices, such as encoded cards and tickets, smart cards and the like. These means may include optical readers and the like. The means may also comprise a keypad, touch screen or the like by which a player may input identity information. As indicated below, the identity information may comprise a player identification number. In other embodiments the identity information may comprise other data, such as a name or image.

Figure 2:
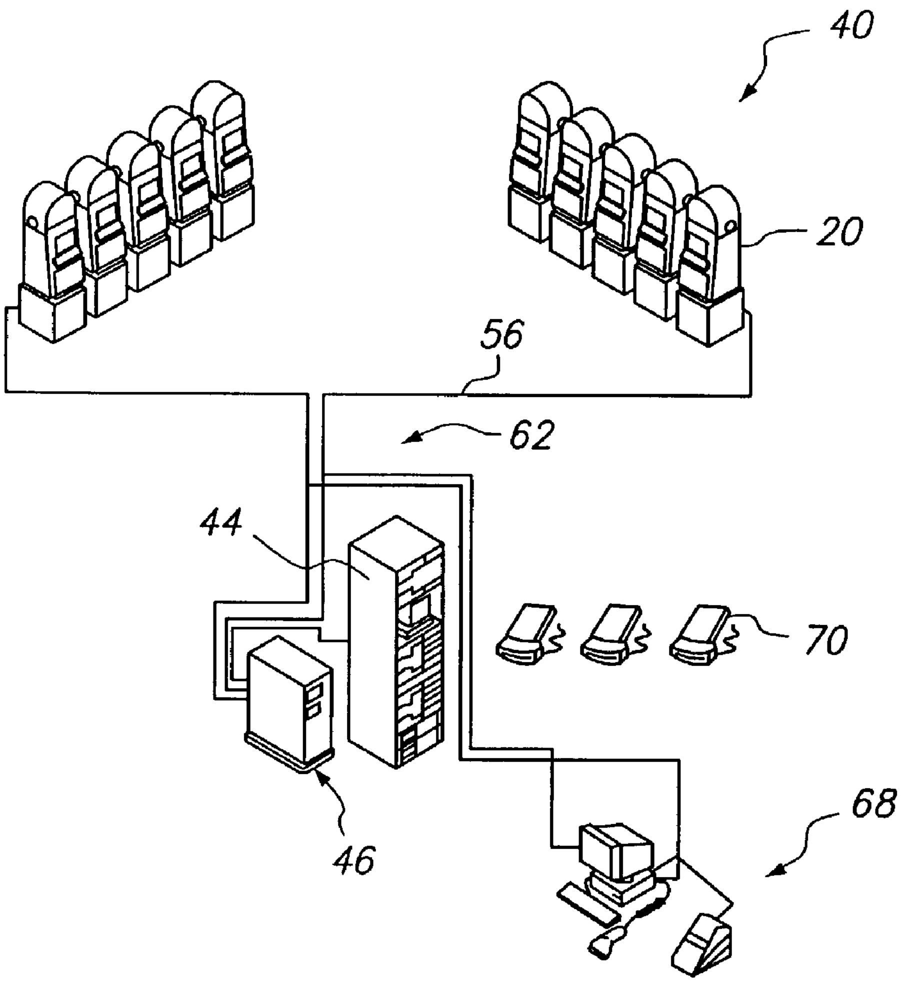
FIG. 2 is a schematic of a game play tracking system in accordance with one embodiment of the invention.

In accordance with the invention there is provided an activity tracking system 40. One embodiment of such a system is illustrated in FIG. 2. The tracking system 40 includes one or more gaming machines or devices. These gaming machines may be similar to the gaming machine 20 illustrated in FIG. 1. The gaming machines or device may have a wide variety of other configurations, and in general may comprise any game which a casino or other entity wishes to monitor. For example, the gaming device may actually comprise a table game, such as a game table adapted to present the game of "Twenty-One" to one or more players. In such event, the table or other game presentation device may include one or more devices arranged to permit implementation of the system and method as detailed below. Such devices may include coin or token acceptors for accepting bets or wagers by each player, or a ticket reader for accepting ticket representing value, and a card reader for reading a player card. The game play monitoring system 40 may also be adapted to monitor the play of other gaming devices or other game events. Such games/devices may include bingo, keno, and sports or other betting events.

In a preferred embodiment, the tracking system 40 includes a tracking system host 44. One or more appropriate communications links, whether wired or wireless, permit information to be transferred to and from each gaming machine 20 and the tracking system host 44. The tracking system host 44 may comprise a single computer or a group of computers associated with one another on a network.

In one embodiment, the tracking system host 44 is adapted to collect information regarding gaming machine activity. In a preferred embodiment, the information which is collected comprises information regarding activities occurring at or associated with the one or more gaming machines 20. The tracking system host 44 is, as further described below, arranged to manipulate the collected information, such as by aggregating game play data and displaying game play information.

The activity information which is collected may comprise a wide variety of information. In one or more embodiments, the activity information comprises information regarding one or more events, preferably including one or more characteristics of that event. The information which is collected is preferably associated with a particular player.

In a preferred embodiment, the identity of a player is obtained so that the collected information can be correlated to that player. In one embodiment, as described in more detail below, the player is identified by input to the gaming machine 20, such as by inserting a player tracking card into the card reader 34.

In one embodiment, the tracking system host 44 includes at least one data storage element 46 for storing the gaming machine activity information. The data storage element 46 may comprise a hard drive, RAM, ROM, tape drive, CD, DVD or other memory or data storage member or element.

In a preferred embodiment of the invention, a communication link 56 is established between the gaming machine 20 and the tracking system host 44. This link may be a wired or wireless communication link. The communication link 56 may be configured in a wide variety of manners, as is known. Generally, the gaming machine 20 includes at least one controller and an associated communication interface. Likewise, the tracking system host 44 includes a communication interface. The configuration of these interfaces depends largely upon the type of communication link utilized, such as wired or wireless.

In one embodiment, the communication link 56 is part of a communication network 62. This network 62 may have a variety of configurations, and as noted above may comprise a wired, wireless or a combination of wired and wireless communication pathways. Depending upon the configuration of the network 62, the network 62 may comprise a wide variety of components besides the gaming machines 20 and the tracking system host 44. For example, the network 62 may include wireless communication relays or transceivers. The network 62 may also include one or more hubs or routers.

As indicated above, the devices which are associated with the network 62 and form a portion of the system 40 may include other than gaming machines 20 per se. For example, the devices may stand-alone or be integrated devices associated with table games such as Blackjack and poker tables, Roulette, Baccarat and Craps.

The network 62 may be associated with or be integrated with other networks. For example, a casino may already have a slot system for controlling the one or more slot-type gaming machines 20. Such a slot system may include a gaming machine host comprising a remotely located computer or server. Each gaming machine 20 may be associated with the host via a communication link. The gaming machine host may be used to monitor security functions of the gaming machine 20 and provide instructions or data to the gaming machine 20. In accordance with the present invention, the network 62 may comprise all or a portion of such a network, but further including the tracking system host 44 and other devices comprising the system of the invention.

The system 40 may include or be associated with, such as via network 62, a plurality of other devices. For example, one or more work stations 68 may be provided. These work stations 68 may comprise computing devices permitting a user to input information and which outputs information to the user, such as via a display. In one embodiment, one or more portable devices 70 may be provided. Like the work stations 68, these devices 70 may include means for accepting an input and providing an output. In one embodiment, the devices 70 are hand-held devices and include means for establishing a wireless communication link. The system 40 may also include other devices such as displays, printers and the like.

Examples of other systems in accordance with the invention are described and illustrated in U.S. application Ser. No. 10/116,680 filed Apr. 4, 2002, to which this application claims priority, and which application is incorporated herein in its entirety by reference. As described therein, the host 44 may be associated with a plurality of systems including a slot system including a plurality of gaming machine 20, as well as other systems such as a Keno system, sports betting system and table games system.

A variety of methods in accordance with the invention will now be described in more detail. One or more methods of the invention may be implemented via the system 40 described above. The methods of the invention may be implemented, however, by other systems or devices. Thus, while the methods described below may be described with specific reference to the system 40, including individual elements thereof, the methods should be construed as applicable to any system or device capable of performing the steps/functions described.

Figure 3:
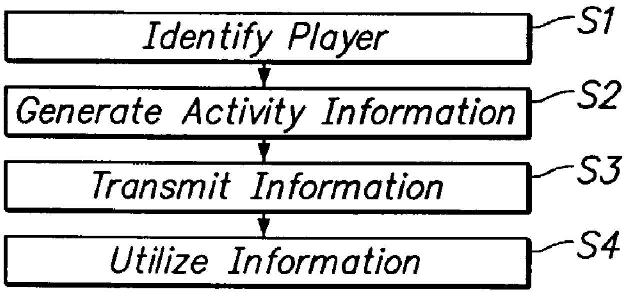
FIG. 3 is flow diagram of a method of the invention.

In one embodiment of a method, gaming machine activity data is transmitted from a gaming machine 20 to the tracking system host 44. As indicated above, in a preferred embodiment, the activity is associated with a particular player. As such, in a first step S1 of a method of the invention, as illustrated in FIG. 3, a player of a gaming machine 20 is identified.

When a player wishes to engage the play of a gaming machine 20 or other gaming device/event, the player preferably identifies themselves. In one embodiment, a player identifies themselves with their player card. As noted above, such a card may be encoded with identification information. When using a gaming machine 20 such as that illustrated in FIG. 1, the player may insert their player card into the card reader 34. The card reader 34 reads the information from the card and then transmits the information. The identification information may be transmitted directly from the gaming machine 20 to the tracking system host 44.

In one embodiment, player identification information may be stored at the tracking system host 44. In response to a player identification code or number, such as that read from the player card, more detailed information regarding the player may be obtained from the memory. In another embodiment, such detailed information may be stored remotely and either obtained by or transmitted to the tracking system host 44. For example, the player card may have an encoded identification code, such as AX18329IK. This code may be associated with the player known as John Doe. A file may be associated with the player's code, which file includes a variety of information such as the full name and address of the player, their telephone number, accrued points, and other data. In response to receiving the player's code, the game play monitoring system host 44 may obtain information regarding the player from the file or other location. Such a data file may be generated by having a player enroll in a rewards program and soliciting the information from them as part of the enrollment process.

A player may identify themselves, or the gaming machine 20 may identify the player, by other means. For example, the player may input a personal identification code into a keypad of the gaming machine 20. In another example, the gaming machine 20 may be equipped with a camera and visual identification of the player may be determined against a databank of player photos.

In one embodiment, if the player is not specifically identified, gaming activity information may be associated with an assigned identification, such as a randomly selected identification number, or a category such as "general player."

In a second step S2 of the invention, information regarding an activity is generated and in a third step S3 is then transmitted to the tracking system host 44. Preferably, information is generated regarding specific individual activities or events occurring at the gaming machine 20.

As indicated in part above, the types of information which are generated and transmitted to the tracking system host 44 may vary. For example, a gaming machine 20 may generate information regarding events such as a player's wager or bet, a time play began, a time play ended, the time a particular game began, the time a particular game ended, the outcome of a particular game, and an award or payout. In an arrangement where the gaming machine 20 is capable of accepting receipts or tickets representing value, the information may include the input of a ticket or an indication that a ticket has been presented or accepted, and/or the value of the ticket. In an arrangement where the gaming machine 20 is capable of issuing receipts or tickets representing value, the information may include the issuance of a ticket and/or the value of the issued ticket.

In a preferred embodiment of the invention, this individual event or activity information is transmitted to the host 44 in the same "raw" form. By "raw" it is meant that the data which is transmitted is that which is directly generated by the gaming machine 20, or its various components, without secondary compilation, aggregation or other manipulation. For example, the gaming controller is preferably arranged to transmit information regarding each bet (such as credits wagered and their value) and amounts won by the player at each bet and each award transaction, instead of in an aggregated form over time. The information may also comprise data regarding each game started and finished by a player, and the time of such.

The "raw" data may be transmitted as generated from the gaming machine 20 to the host 44. The "raw" data may also be collected for a period of time at the gaming machine 20 and then transmitted in a block to the host 44 when network bandwidth permits.

In one or more embodiments at a fourth step S4, the game play data or information is utilized by the tracking system host 44. In one embodiment, some or all of the information may be stored, such as at a memory device associated with or comprising portion of the tracking system host 44. In one embodiment, the data is associated with the particular player which caused the data to be generated. For example, the data may be stored in a player's file. In another embodiment, the data may be stored in one or more files but have player identification data associated with it so that particular data regarding a player can be filtered from data belonging to other players.

In one or more embodiments, some or all of the information may be manipulated, such as aggregated or transformed. The information may also be displayed in one or more formats for viewing. In one or more embodiments, the information may be "mined" based upon a variety of criteria. In one or more embodiments, the information may be graphically displayed.

One embodiment of the invention comprises a method of utilizing the gathered game data. In one embodiment, the method includes the steps of applying criteria to the data, determining data which meets the criteria, and providing the results of this "filtering" to the user.

Figures 4, 5:
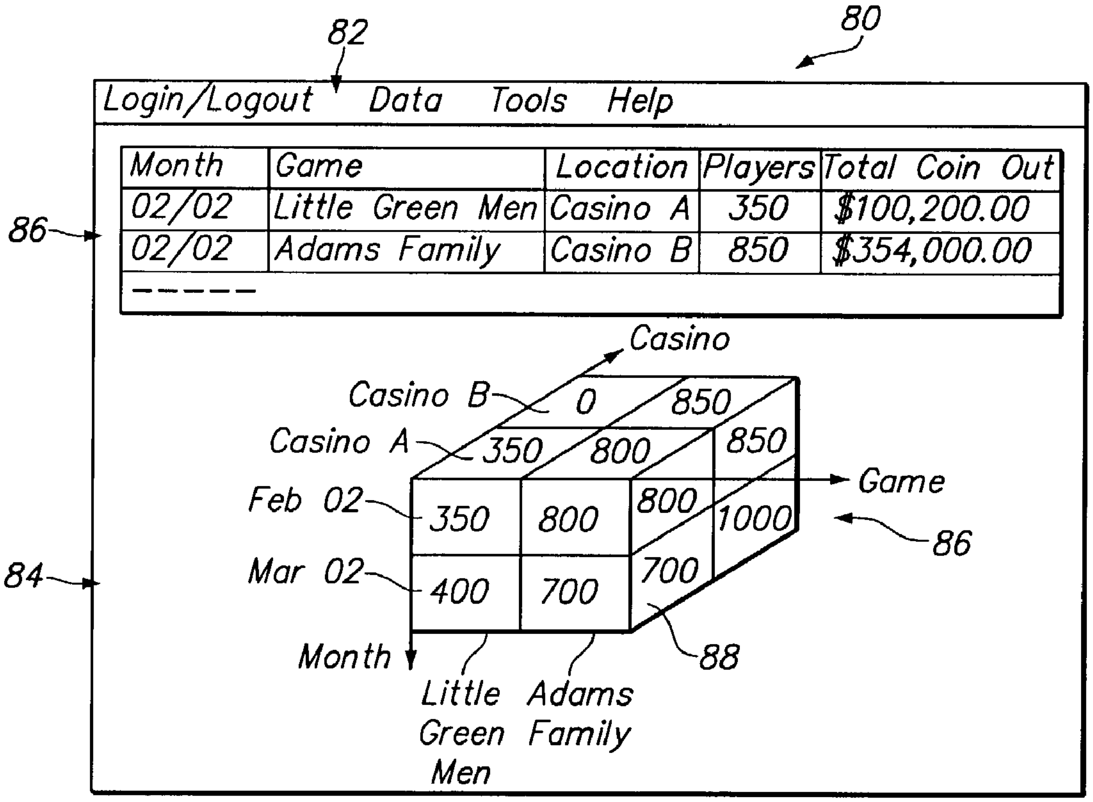
FIG. 4 illustrates one embodiment of gaming machine activity data obtained in accordance with a method of the invention.
FIG. 5 illustrates one embodiment of a graphical interface configured to display gaming machine activity data.

One example of sets of stored data is illustrated in FIG. 4. In one embodiment, the gaming machine 20 generates a set of data or information 100 regarding each event or activity. This set of information 100 includes a plurality of fields 102, each field 102 containing data regarding or defining that event or activity. Preferably, this information is transmitted to the host 44.

As illustrated, each set of data 100 includes information regarding the location of the event in the form of a gaming machine identification number, a player identification number identifying the player playing that machine, and additional information regarding a particular event. In the example illustrated, the event is the play of a particular game at the machine. In this example, the data also includes fields regarding the start time of the game, amount bet by the player, the outcome, the time the game ended, and the amount paid to the player for the winning outcome. As also illustrated, the data includes the time at which the player began play at the gaming machine (such as indicated by the player inserting their tracking card). It will be appreciated that in this arrangement of the invention, the data or information which is generated by the gaming machine 20 and transmitted to the host 44 pertains to a particular event, and not the aggregation of activities or events.

In one embodiment, the user may conduct a search of the information or data based upon a single characteristic or criteria, such as a particular gaming machine (such as machine number), manufacturer, model, area, amounts paid, denominations and the like. The user may also conduct a search of the information or data based upon a plurality of characteristics or criteria.

In another embodiment of the invention, the user may manipulate the information or data, such as by aggregating certain information or data. The data which is manipulated may first be filtered.

For example, data regarding a particular player may be aggregated. All data, or data during a given period of time, may be filtered for activities regarding a particular player. These activities may comprise, for example, total amounts bet, total ticket value in, total ticket value out, total tickets in, total ticket out, or net win. Other information which may be obtained from the raw data using filtering or mining includes the number of visits by a player, the number of games played by a player on one or more gaming machines, the number of different gaming machines (including their type) played by a player over a period of time.

Obtained information may be utilized in a number of ways. For example, if it is determinated that a particular player has wagered a sufficient amount, then the player may be awarded a bonus or the like.

In one embodiment, filtering or mining of the raw individual activity or event data may occur at predetermined time intervals. For example, the host 44 may be programmed to conduct a search through the raw data at predetermined time intervals, such as hourly or daily. As one example of a method, the host 44 may be programmed to conduct a search through the raw data each day, such as of total number of tickets presented or ticket value presented by a single player, for determining if a player is entitled to an award. In this manner, the method includes an automated data mining function.

In one embodiment, the raw individual event or activity data may be analyzed to predict trends. In the prior art, a player is generally not awarded a bonus or complimentary award unless the player has achieved a particular level of assigned points. In accordance with the invention, the raw data may be utilized to determine if a player should be awarded a bonus, even if the player has not already met specific criteria. For example, the raw data may be analyzed and it may be determined that at the rate a particular player is presenting tickets or other value to gaming machines, the player will reach a specific level of game play by a certain date. The player may be awarded an award based on the player's rate of play, and not simply the actual play. As one example, the game operator may indicate to a player that if they reach a level of play before the player would reach a predetermined level of play based on their playing trend, they will receive a particularly large bonus or award. This may be used to entice the player to play at even a higher rate of betting or to play more frequently to reach the specified plateau earlier than they would have based on their previous rate of play.

The trend information may be obtained and utilized for a variety of purposes. As indicated, in the prior art, only basic information is generally tracked regarding a player's play, such as only an assigned number of points. In the prior art, data is not specifically obtained regarding machines and games. In accordance with the invention, the raw data is preferably arranged to include information regarding particular games and gaming machines. The game operator may filter or mine the raw data and determine, for example, that a particular type of gaming machine is suffering from a downward trend in total number of games played by players. The game operator may utilize this data to, for example, replace those machines with gaming machines which players are playing more frequently.

Another embodiment of the invention comprises a method in which the output of the "mining" or manipulation of the data is generated. In one embodiment, the outputting step comprises displaying, such as on a screen or by printing, the information. As described below, the data which is displayed may be aggregated, filtered or manipulated before being displayed.

As disclosed in co-pending U.S. application Ser. No. 10/116,680 which is incorporated by reference, a variety of interfaces may be utilized to display the output of the mining step, including the results of a filtering of information. The interfaces may include a variety of menus for making selections regarding the use and display of data. As described therein, this data or information may be displayed in bar graph form, text output or the like.

FIG. 5 illustrates one embodiment of a graphical user interface 80 which is useful in presenting game play information and permitting input by a user of the system to perform actions relative to the data or information. Though not illustrated, such an interface 80 may be displayed on a display associated directly with the game play monitoring system host 44 (such as controlled by a processor thereof). Alternatively, the interface 80 may be displayed on a display of another device associated with the host 44. For example, in one embodiment, the game play monitoring system host 44 may be adapted to generate the interface 80 and display it at the one or more remote work stations 68, such as in response to a particular input at one or more of those stations. In another embodiment, the data may be exported to a remote station or other system/device. For example, collected game play information over a period of time may be stored at the host 44, and then transmitted to a remote station for use, including display. The information may be transmitted to the portable device 70, such as a hand-held display device utilized by a mobile user, such as while on the casino floor.

As illustrated in FIG. 5, the interface 80 is preferably adapted to display game play information. The interface 80 is also adapted to receive user input for engaging in a wide variety of actions.

A variety of information may be displayed. Such information may include, but is not limited to the following: total number of gaming machines presently in use/play; the number of players of the gaming machines in use which are presently active or playing a game; the number of players of gaming machines who have provided their player identification information (or the number of players of machines who have not); the type of gaming machines which are being played; and a wide variety of other information.

As indicated above, the information may be displayed in a variety of forms. For example, the information may be displayed in graphical form, such as a pie or bar graph. The information may also or alternatively be displayed in table or other format.

In one or more embodiments, the interface 80 includes a display area or window 84 in which the information may be displayed. This display area 84 may be divided into a plurality of areas, each displaying different information.

In one embodiment, the interface 80 also includes a menu 82. The menu 82 allows a user to select one or more actions or activities. These actions may comprise changing the format of the display area 84, manipulating the information and presenting it in a different form, or engaging in administrative functions associated with the game monitoring system 44. The menu 82 may include both drop-down menus associated with keywords, and individual icons for initiating certain functions or actions.

A wide variety of features may be provided. For example, a help menu may be provided for providing a user information regarding how to perform certain actions. A user may also be permitted to generate custom reports using filter parameters. A user may be permitted to change aesthetic and functional aspects of the interface 80, such as the colors, fonts, sounds and the like. In one embodiment additional useful information such as the time, date and the like associated with the processor of the host 44 may be displayed. These menus and other features are disclosed in more detail in co-pending U.S. application Ser. No. 10/116,680 incorporate herein by reference.

FIG. 5 illustrates one particular preferred arrangement by which data may be displayed in accordance with the invention. In one embodiment, information may be displayed in a table type format. As illustrated, the table 86 may be arranged to display more than a single data element, or even only two elements. For example, the table 86 is not limited to displaying only a player's name and the player's total number of points. Instead, the table 86 is preferably configured to display multiple data elements either comprising the raw data or the raw data after manipulation. As one example, as illustrated, the raw data may be filtered to determine during a particular month the number of players of a particular type of game and the total value of monies paid out by those machines.

In a preferred embodiment of the invention, the data may be displayed in a three-dimensional format. In one embodiment, there is provided a three-dimensional graphical display 86. The three-dimensional graphical display 86 may be based on a three-axis coordinate system. Data may be displayed relative to the three axes, such as in cubic form. In the example illustrated, the three axis each represent a particular characteristic of data, such as game identity, name of casino, and month of the year. Display elements 88 may be displayed with respect to the axes, the display elements 88 graphically representing data relative to the particular axes characteristics. The size of the display elements 88 may be the same (as illustrated), or may depend upon data value. For example, if particular data represented by one display element 88 is twice the value of particular data represented by another display element 88, the first display element may be graphically illustrated twice the size of the second display element.

In one embodiment, the display element 88 illustrates or displays particular data. As illustrated, this data may comprise the particular value of the characteristic of the axes. For example, in the embodiment illustrated, the display element 88 may include the name of the particular game corresponding to the "game identity" axes, the name of a particular casino corresponding to the "casino" characteristic, and the name of a month.

In accordance with this embodiment of the invention, one or more of the display elements 88 may display information regarding a fourth characteristic. This information may be displayed on surfaces representing the display element 88. For example, in the embodiment illustrated, the display elements 88 are configured to display a numerical value representing the number of players of the particular game, at the particular casino, during the particular identified month. In this manner, a particular characteristic, number of players, may be correlated to three other characteristics.

In one embodiment, each display element 88 may comprise a container element. In this configuration, a user may select a particular display element 88 and that display element may reveal additional information. For example, by selecting a particular display element 88 with a mouse pointer or the like, additional data in table or other form may be displayed to the user. The form and content of this data may vary.

A variety of other configurations of the invention other than those described above are contemplated. For example, the system of the invention may be arranged to include the gaming machines of more than a single casino. In this arrangement, data regarding gaming machines at a plurality of gaming machines may be transmitted to a single host. The data regarding gaming machines at a particular casino or other location may first be transmitted to a host at that location, and then transmitted to a central host pertaining to all locations. Of course, in this arrangement, appropriate communication links must be established between the gaming machines, the multiple local hosts (if they are utilized), and the one or more remote hosts. In this configuration, data regarding gaming machine activity at two or more casinos or locations may be obtained and, as illustrated in FIG. 5, used, such as by displaying the data.

In a "multiple casino" or multi-location embodiment, information regarding a players activities at each casino or location may be compared. For example, a player's total play time or total amount bet at different casinos over a period of time may be obtained and displayed. In addition, information may be provided regarding the player's current location. For example, referring to FIG. 4, generated data may include casino identification information. This information may be used to identify the player's activities by casino, including their current location if they are currently playing.

The systems, methods and interfaces of the present invention have numerous advantages. First, a system is provided by which raw data regarding individual events or activities occurring at one or more gaming machines may be obtained. In one embodiment, this raw data may include specific information regarding a particular player's activities. This raw data may be collected and stored at a central location remote from a plurality of gaming machines which are being monitored.

Using the raw data, a variety of functions may be performed. These functions include the "mining" of the raw data for specific information, the aggregation of the data, and other manipulation of the data. By utilizing the raw data, information such as trends may be determined. These trends may be utilized for a variety of purposes, such as changing gaming machines and providing awards to players. In this regard, one aspect of the invention is a method of determining if a player is entitled to a reward, such as a reward separate from one awarded by direct play of a gaming machine. This method includes monitoring, such as by periodically mining, individual event or activity information to determine if the player has met one or more criteria or requirement for such an award.

In one embodiment, the activity information or data may be mined at predetermined times or time intervals. In this configuration, a determination may be made if specific criteria have been met at one or more times. Notification may be provided if specific criteria have been met, such as for awarding a player a bonus or complimentary award.

As another aspect of the invention, there is a method of providing information. In one embodiment, this method comprises displaying the information or data, in either its raw individual event or activity form, or as aggregated or manipulated. The data may be displayed in a table form, or by a graphical representation. In one embodiment, 3, 4 or more different data characteristics may be displayed relative to one another. The data may be displayed three-dimensionally in the form of a graph. In this manner, a user of the system and method may determine the inter-relationship between various characteristics of the information. For example, a user may determine that particular games perform better at certain casinos than others, or determine a correlation between amounts wagered by players of one game versus another.

Notably, this method of displaying multi-dimensional views of information regarding a plurality of criteria or characteristics is only available because the activity or event data is generated on an event by event basis and provided to the host 44 in an un-aggregated form. Of course, the number of dimensions of the view or output is dependent upon the number of fields or characteristics of the data which are generated.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A data processing apparatus for tracking gaming machine activity to award a bonus, the apparatus comprising:

an interface configured to transmit activity data over a data network; and a processor configured to:

generate data regarding individual activities associated with the operation of a gaming machine;

transmit the individual activity data to a remote location;

store the individual activity data at the remote location;

mine the stored individual activity data based on one or more characteristics;

generate trend information based upon the mined data, the trend information representing one or more trends of the mined data, including generating a graphical representation of the mined data in three dimensions, and the trend information including a rate at which a player presents value to the gaming machine;

determine a target date by which the player is expected to reach a target level of play, wherein the target date is based upon the rate at which the player presents value to the gaming machine;

display the graphical representation in the three dimensions, wherein the graphical representation is based on a coordinate system having at least three axes, a first axis represents a game identity, a second axis represents a casino identity, and a third axis represents time;

determine that the player has reached the target level of play before the target date; and award the bonus to the player when the player reaches the target level of play before the target date, wherein the bonus is independent of a game outcome.

2. The apparatus in accordance with claim 1 wherein the individual activities comprise the providing of value to the gaming machine.

3. The apparatus in accordance with claim 2 wherein the providing of value comprises an input of currency, coin, value ticket or credit to the gaming machine.

4. The apparatus in accordance with claim 1 wherein the processor is further configured to identify a player of the gaming machine and associate the generated trend information with the identified player.

5. The apparatus in accordance with claim 4 wherein the processor is further configured to store the individual activity data in a set in a file at the remote location, the set including a plurality of fields, and one of the fields comprising the identity of the player.

6. The apparatus in accordance with claim 1 wherein the processor is further configured to aggregate data which satisfies one or more characteristics.

7. The apparatus in accordance with claim 1 wherein the individual activity data comprises amounts of value provided by a player to the gaming machine and the trend information comprises an aggregation of amounts of value provided by an identified player during a period of time.

8. The apparatus in accordance with claim 1 wherein the processor is further configured to identify the location of the player of the gaming machine.

9. The apparatus in accordance with claim 1 wherein the processor is further configured to generate data indicating the location of the gaming machine.

10. The apparatus in accordance with claim 1 wherein the processor is further configured to mine the stored individual activity data at predetermined time intervals.

11. The apparatus in accordance with claim 1 wherein the individual activity data is selected from the group consisting of: value provided to gaming machine, value paid by gaming machine, ticket acceptance by gaming machine, and ticket issued by gaming machine.

12. The apparatus in accordance with claim 1 wherein the generated individual activity data includes information regarding the identification of the gaming machine and a time of the activity.

13. The apparatus of claim 1, wherein the processor is further configured to display the generated trend information relative to the three axes.

14. The apparatus of claim 1, wherein each of the three axes corresponds to a respective one of a plurality of characteristics.

15. The apparatus of claim 14, wherein the generated trend information includes data values relative to the respective characteristics.

16. The apparatus of claim 14, wherein the generated trend information includes data values relative to a further characteristic.

17. A data processing apparatus for tracking gaming machine activity to award a bonus, the apparatus comprising:

an interface configured to receive activity information over a data network; and a processor configured to:

receive individual activity information associated with the operation of a gaming machine;

determine trend information based on the individual activity information, the trend information representing one or more trends of the individual activity information, the trend information including a rate at which a player presents value to the gaming machine;

generate an output regarding the determination, including generating a graphical representation of the individual activity information;

determine a target date by which the player is expected to reach a target level of play, wherein the target date is based upon the rate at which the player presents value to the gaming machine;

display the graphical representation in three dimensions;

determine that the player has reached the target level of play before the target date; and award the bonus to the player when the player reaches the target level of play before the target date, wherein the bonus is independent of a game outcome.

18. The apparatus in accordance with claim 17 wherein the generated output comprises an aggregation of information regarding at least one of a plurality of characteristics.

19. The apparatus in accordance with claim 18 wherein at least one of the characteristics is selected from the group consisting of machine identification, identification of a game played at the gaming machine, identification of a player of the gaming machine, time of the activity, outcome of a game played at the gaming machine, value of funds provided to the gaming machine, value of funds paid by the gaming machine, and machine location.

20. The apparatus in accordance with claim 17 including the step of additionally displaying the graphical representation in a table format.

21. A data processing apparatus for tracking gaming machine activity to award a bonus, the apparatus comprising:

an interface configured to receive activity information over a data network; and a processor configured to:

receive data regarding individual activity of an identified player associated with the play of a game of chance on a gaming machine;

store the individual activity data;

mine the stored individual activity data based on one or more characteristics of game play;

determine trend information based on the mined data, the trend information representing one or more trends of the mined data;

generate an output regarding the determination, including generating a graphical representation of the mined data in three dimensions;

determine a target date by which the player is expected to reach a target level of play, wherein the target date is based upon the rate at which the player presents value to the gaming machine;

display the graphical representation in the three dimensions, wherein a first axis represents a game identity, a second axis represents a casino identity, and a third axis represents time;

determine that the player has reached the target level of play before the target date; and award the bonus to the player when the player reaches the target level of play before the target date, wherein the bonus is independent of a game outcome.

22. The apparatus in accordance with claim 21 wherein the individual activity data includes data regarding each instance an amount of value is provided to the gaming machine by the player.

23. The apparatus in accordance with claim 21 wherein the individual activity data includes data regarding a ticket provided to the gaming machine by the player.

24. A data processing apparatus for tracking gaming machine activity to award a bonus, the apparatus comprising:

an interface coupled to receive activity information over a data network, the activity information associated with the operation of a gaming machine;

a processor operatively coupled to:

determine trend information based on the received activity information, the trend information representing one or more trends of the activity information, and the trend information including a rate at which a player presents value to the gaming machine, generate an output regarding the determination, including a graphical representation of the received activity information, determine a target date by which the player is expected to reach a target level of play, wherein the target date is based upon the rate at which the player presents value to the gaming machine, determine that the player has reached the target level of play before the target date, and award the bonus to the player when the player reaches the target level of play before the target date, wherein the bonus is independent of a game outcome; and a display coupled to display the graphical representation in three dimensions, wherein the graphical representation is based on a coordinate system having at least three axes, a first axis represents a game identity, a second axis represents a casino identity, and a third axis represents time.

25. The data processing apparatus of claim 24, further comprising:

a storage medium coupled to:

receive the activity information from a gaming machine over the data network, and store the activity information.

26. The data processing apparatus of claim 24, the processor further coupled to mine the activity information.

27. The data processing apparatus of claim 24, the processor further coupled to periodically mine the activity information.

28. The data processing apparatus of claim 24, wherein the graphical representation includes the trend information.

29. The data processing apparatus of claim 24, wherein the activity information relates to player activity.

30. The data processing apparatus of claim 24, wherein the activity information relates to gaming machine activity.

31. The data processing apparatus of claim 24, wherein the trend information includes a rate of gaming machine activity.

32. The data processing apparatus of claim 24, wherein the trend information includes an identification of one selected from the group consisting of a player, a game, a gaming machine, a type of gaming machine, a location of a gaming machine, and a location of a gaming establishment.

33. The data processing apparatus of claim 24, wherein the graphical representation comprises cubic display elements in a cubic arrangement, the elements graphically representing data relative to the particular axes characteristics.

34. The data processing apparatus of claim 33, wherein the size of each display element is proportional to a data value represented by the display element.

* * * * *